United States Patent
Guggilla et al.

(10) Patent No.: US 10,698,868 B2
(45) Date of Patent: Jun. 30, 2020

(54) IDENTIFICATION OF DOMAIN INFORMATION FOR USE IN MACHINE LEARNING MODELS

(71) Applicant: Accenture Global Solutions Limited, Dublin (IE)

(72) Inventors: Chinnappa Guggilla, Bangalore (IN); Praveen Maniyan, Kayamkulam (IN); Madhura Shivaram, Bangalore (IN); Naveen Bansal, Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 299 days.

(21) Appl. No.: 15/816,072

(22) Filed: Nov. 17, 2017

(65) Prior Publication Data

US 2019/0155924 A1    May 23, 2019

(51) Int. Cl.
| | |
|---|---|
| *G06F 16/21* | (2019.01) |
| *G06N 20/00* | (2019.01) |
| *G06F 16/84* | (2019.01) |
| *G06F 16/335* | (2019.01) |
| *G06F 16/35* | (2019.01) |
| *G06F 16/2457* | (2019.01) |
| *G06F 16/33* | (2019.01) |
| *G06F 16/36* | (2019.01) |
| *G06F 16/248* | (2019.01) |

(52) U.S. Cl.
CPC .......... *G06F 16/211* (2019.01); *G06F 16/335* (2019.01); *G06F 16/84* (2019.01); *G06N 20/00* (2019.01); *G06F 16/248* (2019.01); *G06F 16/24578* (2019.01); *G06F 16/3344* (2019.01); *G06F 16/35* (2019.01); *G06F 16/367* (2019.01)

(58) Field of Classification Search
CPC .... G06F 16/3344; G06F 16/35; G06F 16/367; G06F 16/24578; G06F 16/248; G06F 16/335; G06F 16/353; G06F 16/20; G06F 16/24522; G06F 16/254; G06F 16/28; G06F 16/3329
USPC ................ 707/722, 728, 734, 737, 739, 769
See application file for complete search history.

(56) References Cited

U.S. PATENT DOCUMENTS

| | | | |
|---|---|---|---|
| 8,725,666 B2 | 5/2014 | Lemmond et al. | |
| 10,157,347 B1* | 12/2018 | Kasturi | ............... G06F 16/3322 |
| 10,373,067 B1* | 8/2019 | Chen | ..................... G06F 16/353 |
| 2005/0138556 A1* | 6/2005 | Brun | ..................... G06F 40/247 |
| | | | 715/264 |
| 2013/0097103 A1 | 4/2013 | Chari et al. | |

(Continued)

*Primary Examiner* — Dangelino N Gortayo
(74) *Attorney, Agent, or Firm* — Harrity & Harrity, LLP

(57) ABSTRACT

A device may analyze a set of unstructured documents of an organization associated with a domain to identify a first set of entities. The device may analyze a set of semi-structured documents of the organization to determine a second set of entities. The device may filter the first set of entities using the second set of entities. Filtering the first set of entities may include removing, from the first set of entities, one or more entities that do not satisfy a threshold level of similarity with entities included in the second set of entities. The device may consolidate the filtered first set of entities and the second set of entities to identify a set of key entities. The device may provide the set of key entities to a user device to allow the set of key entities to be annotated and used for one or more machine learning models.

20 Claims, 8 Drawing Sheets

(56) References Cited

U.S. PATENT DOCUMENTS

| | | | |
|---|---|---|---|
| 2016/0092448 A1* | 3/2016 | Byron | G06F 16/3344 |
| | | | 707/739 |
| 2016/0224645 A1* | 8/2016 | Dang | G06F 16/86 |
| 2018/0052823 A1* | 2/2018 | Scally | G06F 16/353 |
| 2018/0107648 A1* | 4/2018 | Ackermann | G06F 17/278 |
| 2018/0300425 A1* | 10/2018 | Azmi | H04L 67/1002 |
| 2019/0005395 A1* | 1/2019 | Dutkowski | G06N 5/022 |

\* cited by examiner

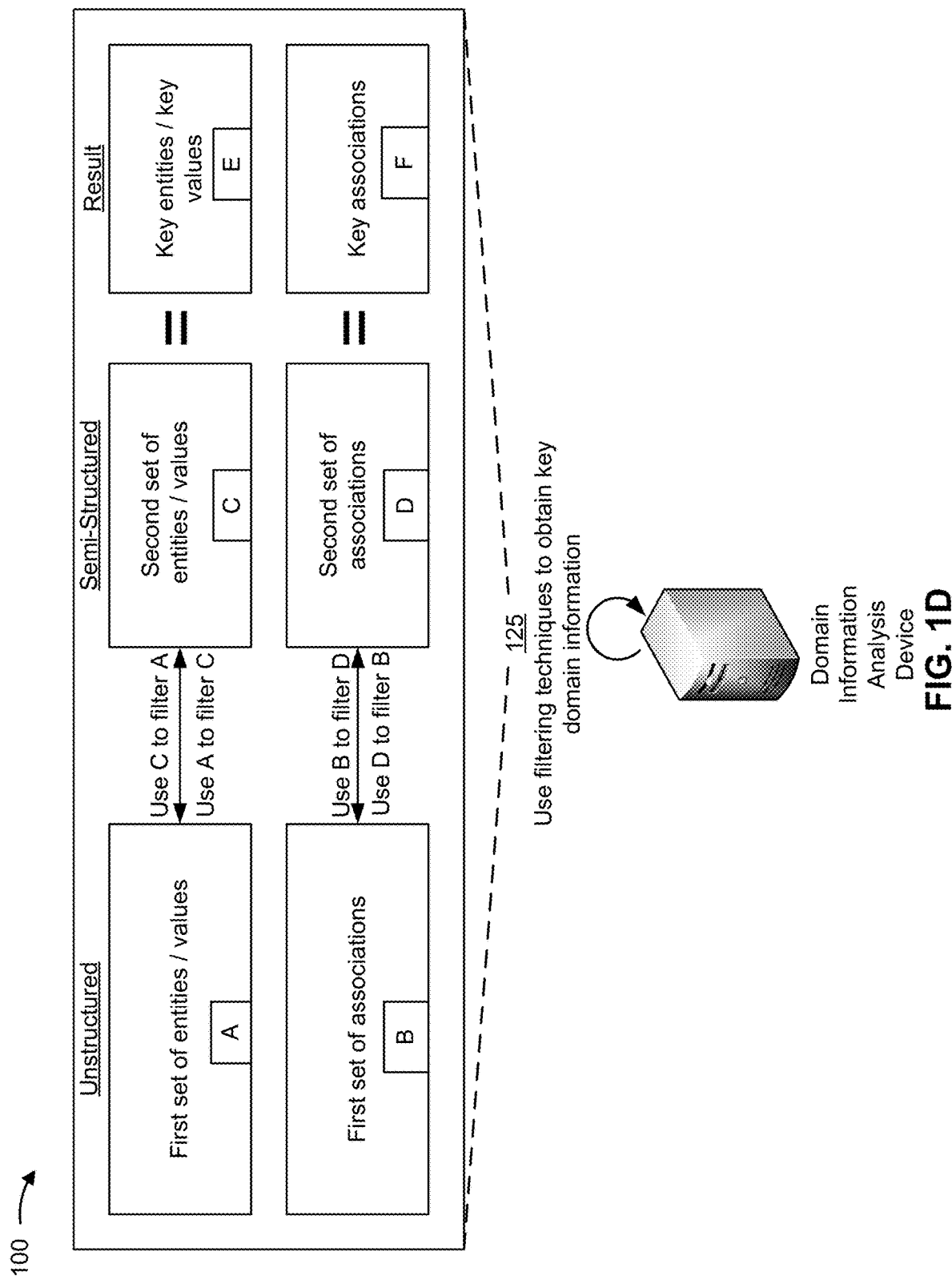

IDENTIFICATION OF DOMAIN INFORMATION FOR USE IN MACHINE LEARNING MODELS

BACKGROUND

Machine learning is a field of computer science that gives computers the ability to learn without being explicitly programmed. For example, a machine learning model may be trained on a set of training data, such that the machine learning model may be used to process live data to generate useful predictions and/or classifications.

SUMMARY

According to some possible implementations, a device may receive historical data of an organization associated with a particular domain. The historical data may include a set of unstructured documents and a set of semi-structured documents. The device may determine candidate domain information by analyzing the set of unstructured documents using one or more natural language processing techniques. The candidate domain information may include at least one of a first set of entities or a first set of associations. The device may determine additional candidate domain information by analyzing the set of semi-structured documents using the one or more natural language processing techniques. The additional candidate domain information may include at least one of a second set of entities or a second set of associations. The device may filter the candidate domain information using the additional candidate domain information. The device may filter the additional candidate domain information using the candidate domain information. The device may consolidate the filtered candidate domain information and the filtered additional candidate domain information into key domain information. The device may generate a data structure that associates values included in the key domain information. The device may provide the key domain information to a user device to allow the key domain information to be annotated and used for one or more machine learning models.

According to some possible implementations, a non-transitory computer-readable medium may store one or more instructions that, when executed by one or more processors, cause the one or more processors to receive historical data of an organization associated with a particular domain. The historical data may include a set of unstructured documents and a set of semi-structured documents. The one or more instructions may cause the one or more processors to determine candidate domain information by analyzing the set of unstructured documents using one or more natural language processing techniques. The candidate domain information may include at least one of a first set of entities or a first set of values. The one or more instructions may cause the one or more processors to determine additional candidate domain information by analyzing the set of semi-structured documents using the one or more natural language processing techniques. The additional candidate domain information may include at least one of a second set of entities or a second set of values. The one or more instructions may cause the one or more processors to filter the candidate domain information using the additional candidate domain information. The one or more instructions may cause the one or more processors to filter the additional candidate domain information using the candidate domain information. The one or more instructions may cause the one or more processors to consolidate the filtered candidate domain information and the filtered additional candidate domain information into key domain information. The one or more instructions may cause the one or more processors to generate a data structure that associates values included in the key domain information. The one or more instructions may cause the one or more processors to provide the key domain information to a user device to allow the key domain information to be annotated and used for one or more machine learning models.

According to some possible implementations, a method may include receiving, by a device, historical data of an organization associated with a particular domain. The historical data may include a set of unstructured documents and a set of semi-structured documents. The method may include analyzing, by the device, the set of unstructured documents using one or more natural language processing techniques to identify a first set of entities. The method may include determining, by the device, a second set of entities by analyzing the set of semi-structured documents using the one or more natural language processing techniques. The method may include filtering, by the device, the first set of entities using the second set of entities. Filtering the first set of entities may include removing, from the first set of entities, one or more entities that do not satisfy a threshold level of similarity with entities included in the second set of entities. The method may include consolidating, by the device, the filtered first set of entities and the second set of entities to identify a set of key entities. The method may include generating, by the device, a data structure that is used to store the set of key entities. The method may include providing, by the device, the set of key entities to a user device to allow the set of key entities to be annotated and used for one or more machine learning models.

BRIEF DESCRIPTION OF THE DRAWINGS

FIGS. 1A-1E are diagrams of an overview of an example implementation described herein;

DETAILED DESCRIPTION

Figure 1A:
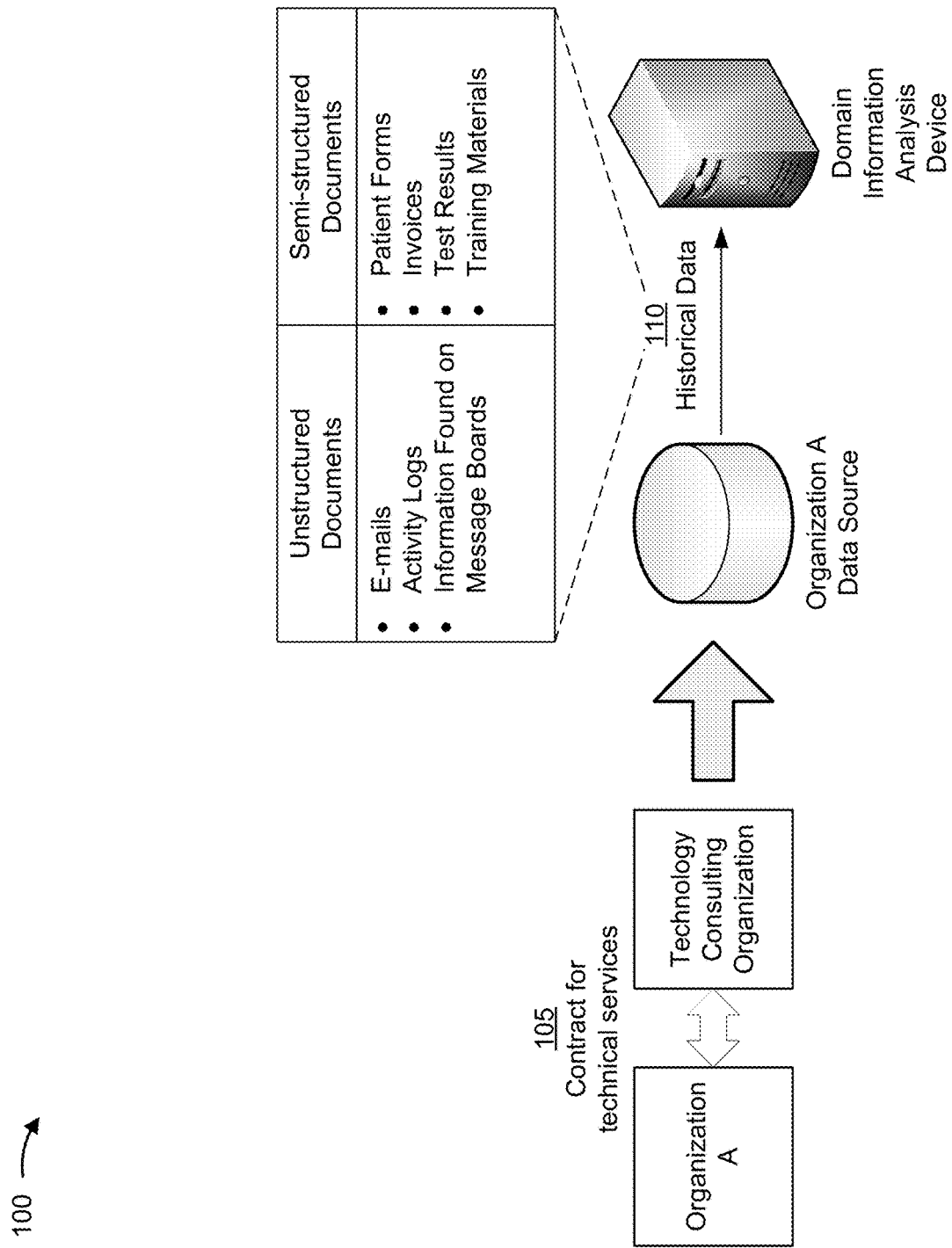

The following detailed description of example implementations refers to the accompanying drawings. The same reference numbers in different drawings may identify the same or similar elements.

A source organization may create machine learning models to improve one or more processes associated with a client organization. The source organization may use machine learning models to improve processes of client organizations that operate in different domains. For example, a client organization may operate in an information technology (IT) domain, in a healthcare domain, in a retail domain, and/or the like.

However, using machine learning models to improve processes associated with client organizations in different domains may require domain-specific knowledge of the domains in which the client organizations operate. For example, to improve one or more processes associated with a client organization in a particular domain, the source organization may need to train a machine learning model using training data that is specific to the particular domain.

Additionally, the process of training machine learning models is often a supervised, manual process that requires a domain expert. Furthermore, machine learning models may be capable of processing text in a particular language (e.g., English), but global organizations may need machine learning models that are capable of processing text in a multitude of different languages (e.g., English, Spanish, French, etc.).

Some implementations described herein provide a domain information analysis device to identify key domain information associated with a particular domain, and to provide the key domain information to a user device to allow annotation of the key domain information as part of training a machine learning model. For example, the domain information analysis device may receive historical data associated with a client organization that includes a set of unstructured documents and a set of semi-structured documents. In this case, the domain information analysis device may analyze the set of unstructured documents to determine candidate domain information. Additionally, the domain information analysis device may analyze the set of semi-structured documents to identify additional candidate domain information.

Furthermore, the domain information analysis device may filter the candidate domain information using the additional candidate domain information, and may filter the additional candidate domain information using the candidate domain information. In this case, the domain information analysis device may consolidate the filtered candidate domain information and the filtered additional candidate domain information into key domain information. Additionally, the domain information analysis device may provide the key domain information to a user device to allow the key domain information to be annotated and used for one or more machine learning models.

In this way, the domain information analysis device automates the process of identifying domain information that may be annotated and used for training machine learning models. Furthermore, the domain information analysis device conserves processing resources that might otherwise be used to process inaccurate entities, inaccurate values, and/or inaccurate associations that are manually input by a user. Moreover, discovery of key domain information may be useful for understanding business processes, training human resources that are specific to particular business process domains, and/or the like.

FIGS. 1A-1E are diagrams of an overview of an example implementation 100 described herein. As shown in FIGS. 1A-1E, example implementation 100 provides a domain information analysis device that identifies key domain information for an organization that operates in a healthcare domain. The key domain information may be used to train machine learning models that are capable of improving processes within the organization. In practice, example implementation 100 may be applied to organizations operating in a number of different domains, such as an organization operating in a retail domain, an organization operating in an IT domain, an organization operating in a financial domain, and/or the like.

As shown in FIG. 1A, and by reference number 105, the organization that operates in the healthcare domain (shown as organization A) may contract with a technology consulting organization for one or more technical services. For example, the technology consulting organization may offer technical services to organization A that involve using one or more machine learning models to optimize processes within organization A. To be able to provide organization A with technical services that optimize processes, the technology consulting organization may need to analyze the historical data of organization A (e.g., using the domain information analysis device).

As shown by reference number 110, the domain information analysis device may receive historical data from a data source associated with organization A. The historical data may include a set of unstructured documents (e.g., e-mails, activity logs describing patient interactions, information included on message boards, etc.) and a set of semi-structured documents (e.g., patient forms, invoices, test results, training materials, etc.), and/or the like.

In this way, the domain information analysis device is able to receive historical data that may be further processed and used to train machine learning models that are capable of improving processes associated with organization A.

Figure 1B:
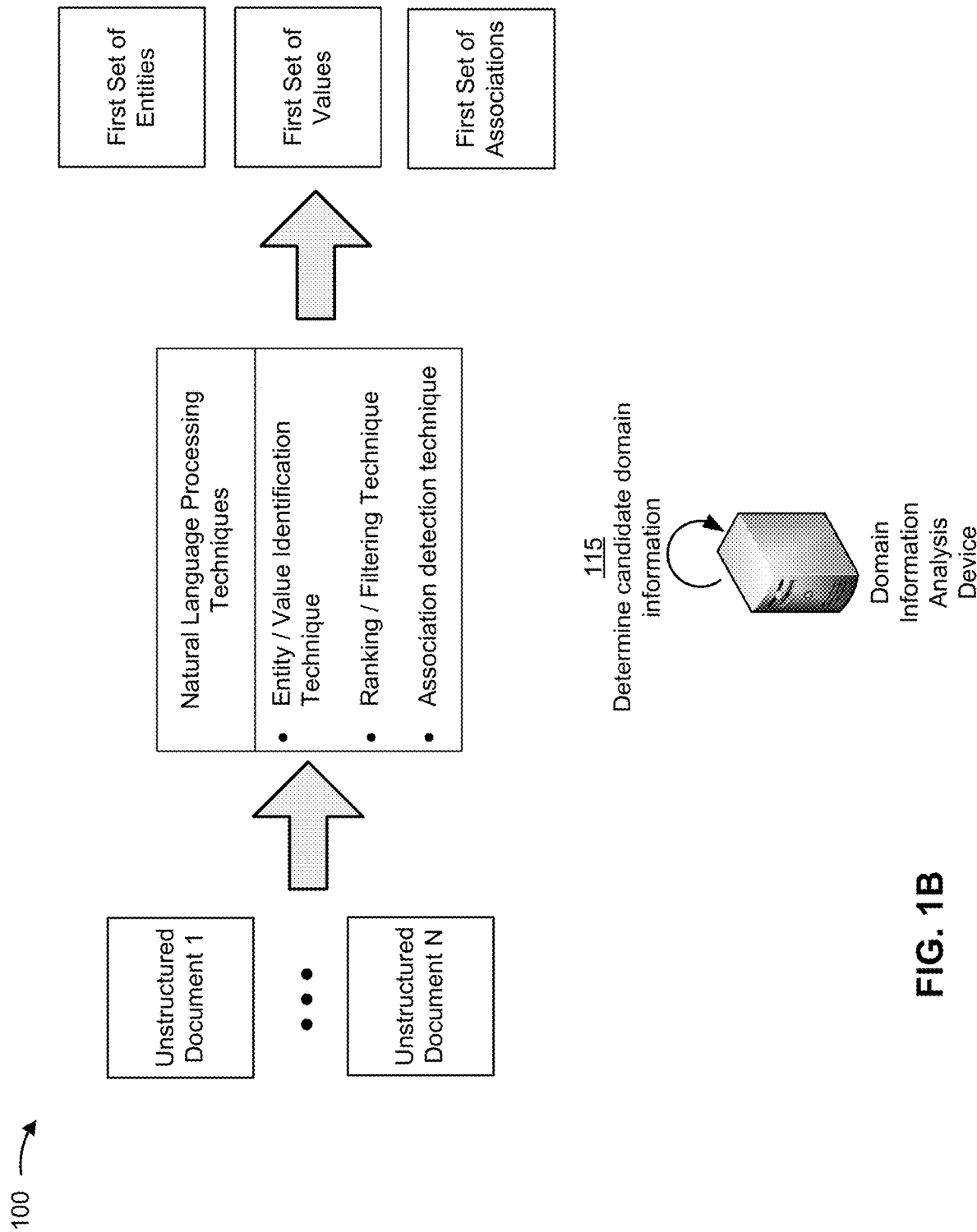

As shown in FIG. 1B, and by reference number 115, the domain information analysis device may determine candidate domain information. For example, the domain information analysis device may determine candidate domain information by analyzing the set of unstructured documents using one or more natural language processing techniques. The candidate domain information may refer to information found in the set of unstructured documents that may be useful for annotating and using as part of a machine learning model. The candidate domain information may include a first set of entities, a first set of values, and/or a first set of associations.

An entity, as used herein, may refer to a term (e.g., a word, a phrase, etc.) that is associated with one or more domains. A value, as used herein, may refer to a particular combination of characters, such as a word, multiple words (e.g., a phrase, a sentence, etc.), and/or the like. In some cases, a value may correspond to an entity. As an example, an e-mail may include the following: "patient identifier: #456," where "patient identifier" is an entity and "456" is a value that corresponds to the entity. An association, as used herein, may refer to an association between two or more entities, between two or more values, between one or more entities and one or more values, and/or the like.

In some implementations, the domain information analysis device determine the first set of entities and/or the first set of values. For example, the domain information analysis device may execute an entity/value identification technique (e.g., an N-gram technique) to parse through the set of unstructured documents to generate an initial set of entities and/or an initial set of values (e.g., a set of N-grams). In this case, the domain information analysis device may generate an initial entity and/or an initial value for all (or some) possible combinations of entities and/or values within each unstructured document included in the set of unstructured documents.

Additionally, the domain information analysis device may rank and/or filter the initial set of entities and/or the initial set of values to determine the first set of entities and/or the first set of values. For example, the domain information analysis device may analyze the initial set of entities and/or the initial set of values using a ranking and filtering technique, such as an entity frequency-inverse document frequency (EF-IDF) technique. In this case, the EF-IDF technique may allow the domain information analysis technique to rank the initial entities and/or the initial values, to filter out stop words and related unimportant words, and/or the like, to determine the first set of entities and/or the first set of values.

In some implementations, the domain information analysis device may execute an association detection technique to determine the first set of associations. For example, the domain information analysis device may execute a long short-entity memory (LSTM) technique to determine the first set of associations, as described in detail further herein.

As an example, an e-mail between a patient and a doctor may include a line or paragraph of text identifying patient information, such as a patient name, a patient address, a patient age, a patient weight, and/or the like. In this case, the domain information analysis device may use the LSTM technique to identify that each entity or each value (e.g., the patient name, the patient address, the patient age, the patient weight) is related or shares an association (e.g., each entity or value relates to patient information).

In this way, the domain information analysis device is able to determine candidate domain information for the set of unstructured documents.

Figure 1C:
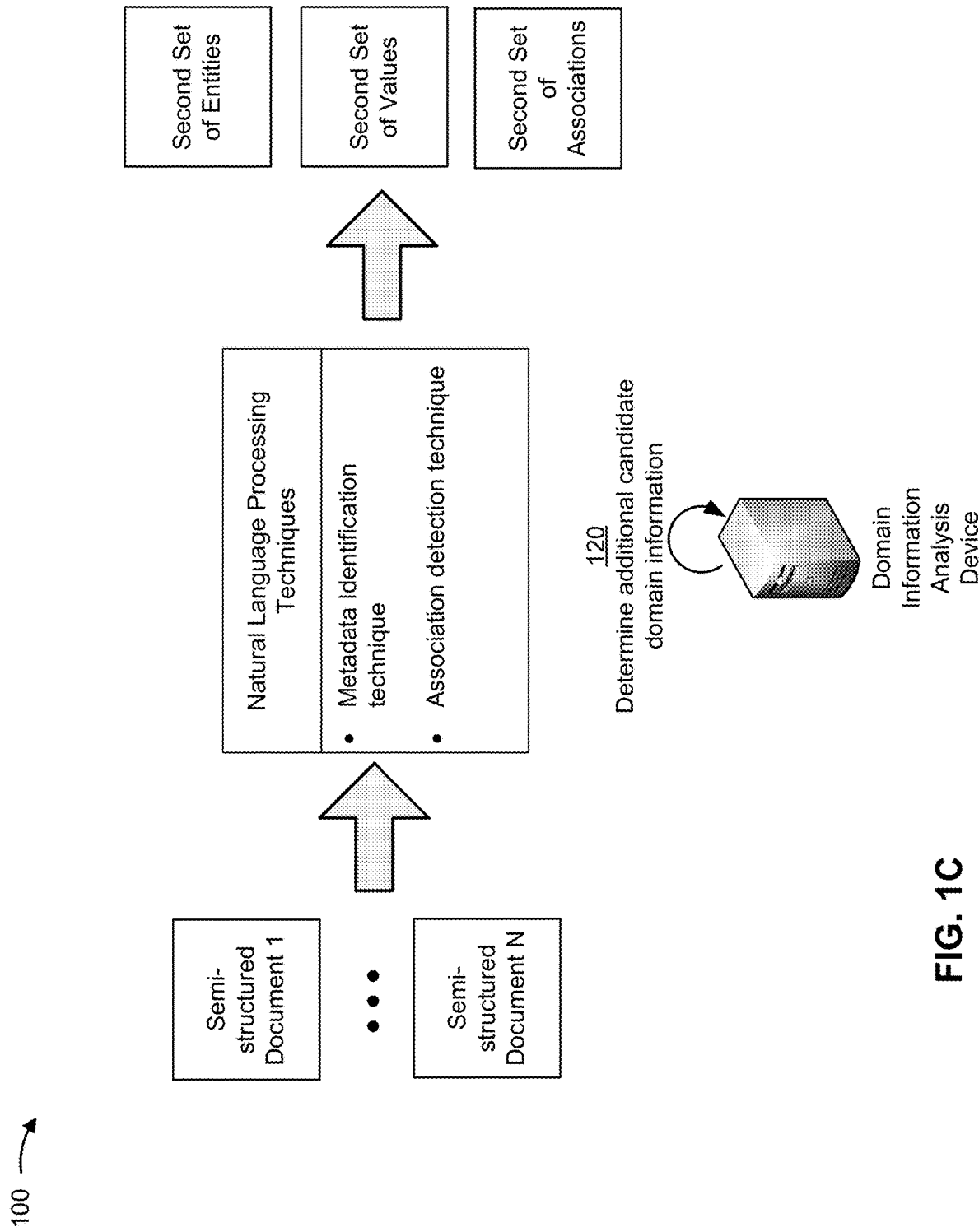

As shown in FIG. 1C, and by reference number 120, the domain information analysis device may determine additional candidate domain information. For example, the domain information analysis device may determine additional candidate domain information by analyzing the set of semi-structured documents using the one or more natural language processing techniques (or additional natural language processing techniques not yet described). The additional candidate domain information may refer to information found in the set of semi-structured documents that may be useful for annotating and using as part of a machine learning model. The additional candidate domain information may include a second set of entities, a second set of values, and/or a second set of associations.

In some implementations, the domain information analysis device may identify document-specific metadata included in each semi-structured document, and may use the document-specific metadata to determine the second set of entities and/or the second set of values. The document-specific metadata may include information associated with a document layout, information associated with positioning of entities or values within a document, information associated with format indicators (e.g., a colon, a semi-colon, a dash, a comma, a tab, a white space, etc.), and/or the like.

Additionally, the domain information analysis device may use the document-specific metadata to determine the second set of entities and/or the second set of values. For example, the domain information analysis device may identify that a format indicator in a patient form is a colon, and may determine entities and values by using the colon to separate text included in the patient form. As an example, if a patient form includes "Name: John Doe," the domain information analysis device may separate the text using the colon, and may identify "name" as an entity (to be included in the second set of entities) and may identify "John Doe" as a value (to be included in the second set of values).

In some implementations, the domain information analysis device may determine the second set of associations. For example, the domain information analysis device may determine the second set of associations by executing the association detection technique (e.g., the LSTM technique), in the same manner described above.

In this way, the domain information analysis device is able to determine additional candidate domain information for the set of semi-structured documents.

As shown in FIG. 1D, and by reference number 125, the domain information analysis device may execute a set of filtering techniques to obtain key domain information. For example, the domain information analysis device may filter the candidate domain information using the additional candidate domain information and may filter the additional candidate domain information using the candidate domain information. Additionally, the domain information analysis device may consolidate the filtered candidate domain information and the filtered additional candidate domain information to obtain key domain information.

In some cases, the candidate domain information and/or the additional candidate domain information may include one or more "noisy" entities, values, and/or associations. A noisy entity, value, and/or association, as described herein, may refer to an entity, a value, and/or an association, that includes spelling errors, abbreviations, non-standard words, missing punctuations, missing letters, pause words (e.g., um), stop words, and/or the like.

In some implementations, the domain information analysis device may filter the first set of entities using the second set of entities. For example, the second set of entities may include less noisy entities than the first set of entities because the second set of entities is determined using document-specific metadata that often delineates entities and values. As such, the second set of entities may be used to filter noisy entities that are included in the first set of entities. A similar analysis may be used to filter the first set of values using the second set of values.

In some implementations, the domain information analysis device may filter the second set of associations using the first set of associations. For example, the first set of associations may include less noisy associations than the second set of associations because unstructured documents often include more sentence context information (e.g., relative to semi-structured documents, which may include shorter, more specific responses to particular questions or fields within the semi-structured document). As such, the first set of associations may be used to filter noisy associations that are included in the second set of associations.

In some implementations, the domain information analysis device may consolidate the filtered candidate domain information and the filtered additional candidate domain information to obtain key domain information. For example, the domain information analysis device may consolidate the filtered first set of entities and the filtered second set of entities to obtain a set of key entities. Additionally, the domain information analysis device may consolidate the filtered first set of values and the filtered second set of values to obtain a set of key values. Additionally, the domain information analysis device may consolidate the filtered first set of associations and the filtered second set of associations to obtain a set of key associations.

In this way, the domain information analysis device is able to use filtering techniques to obtain key domain information.

Figure 1E:
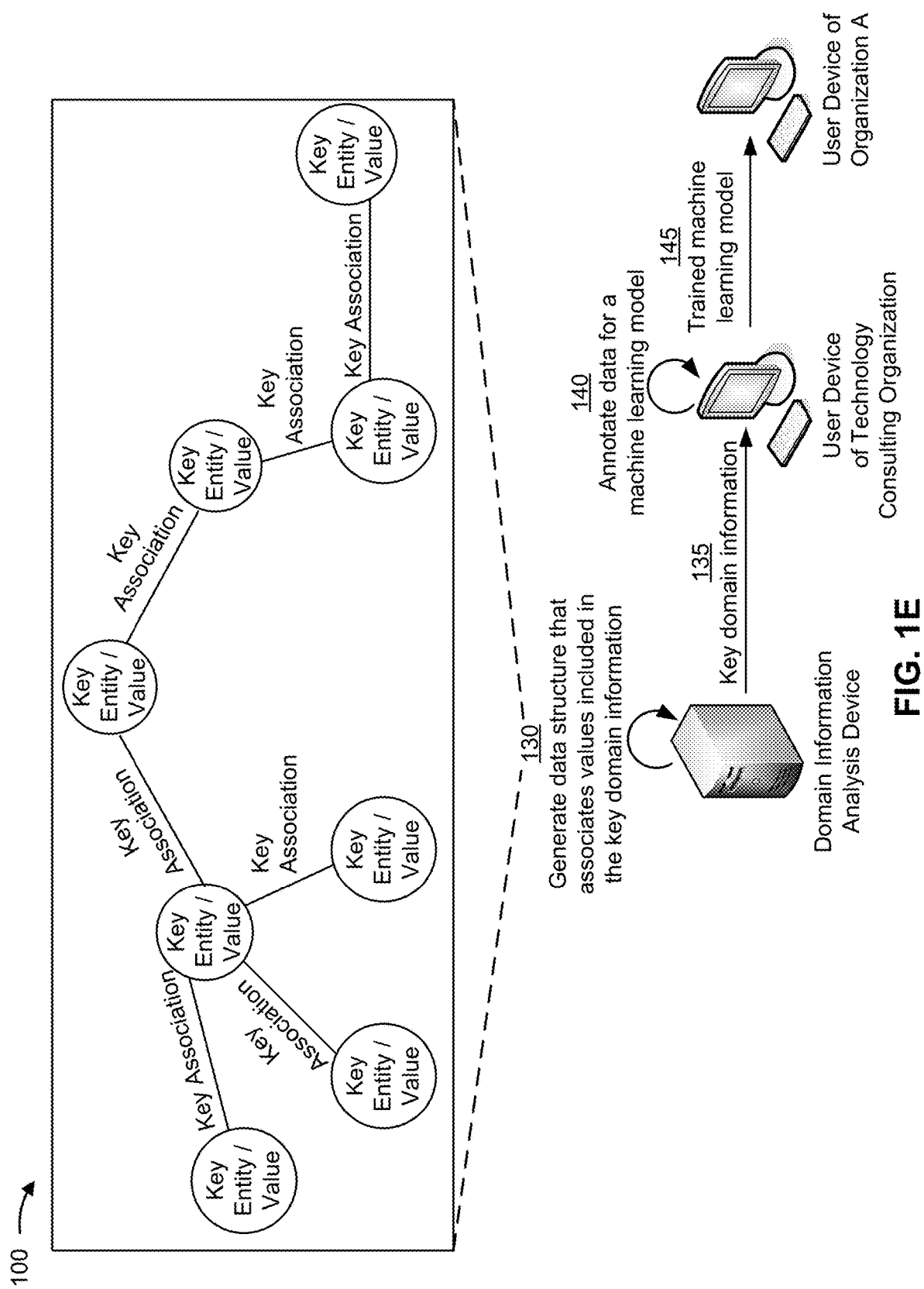

As shown in FIG. 1E, and by reference number 130, the domain information analysis device may generate a data structure that associates values included in the key domain information. For example, the domain information analysis device may generate a data structure using a graph, a tree, a linked-list, an array, a database (e.g., a relational database), a hash table, and/or the like. As shown, the domain information analysis device may generate a graph data structure that uses key entities and key values as nodes and key associations as edges.

In some cases, the domain information analysis device may generate a data structure to associate key domain information of different sub-domains within the same domain and/or key domain information of different domains. In this way, the graph data structure may be used to identify entities, values, and/or associations that overlap between sub-domains, entities, values, and/or associations that overlap between domains, and/or the like.

As shown by reference number 135, the domain information analysis device may provide the key domain information to a user device of the technology consulting organization. As shown by reference number 140, a user interface of the user device may display the key domain information, and a software developer tasked with training a machine learning model may interact with the user interface to annotate values included in the key domain information.

As shown by reference number 145, the user device of the technology consulting organization may provide the trained machine learning model to a user device of organization A. In this way, the user device of organization A may use the trained machine learning model to process live data associated with organization A.

As an example, assume the machine learning model is trained to output a coefficient value associated with predicting whether organization A has enough employees to support work performed by a particular department. In this example, patient forms for patients in the particular department may be provided as input to the machine learning model, which may cause the machine learning model to output a coefficient value that indicates whether the number of staffed employees is an appropriate number of staffed employees to support the work performed by the department. In practice, the key domain information may be used to train machine learning models that make a number of different predictions and/or classifications, such as a likelihood of a particular patient paying an invoice, a likelihood of a particular patient recovering from a particular illness, and/or the like.

In this way, the user device of the technology consulting organization is provided with the key domain information that is needed to create a machine learning model, without having to manually search through the historical data to identify the key domain information. Additionally, having the user manually identify the key domain information is often an error-prone process, and the domain information analysis device conserves processing resources and/or storage resources that might otherwise be used to obtain and store inaccurate entities, inaccurate values, and/or inaccurate associations. Furthermore, the user device of organization A is able to receive a trained machine learning model, and use the trained machine learning model to optimize one or more business processes of organization A.

As indicated above, FIGS. 1A-1E are provided merely as an example. Other examples are possible and may differ from what was described with regard to FIGS. 1A-1E. For example, the domain information analysis device may analyze historical data that includes texts written in multiple languages, thereby allowing the data to be used to train machine learning models that are language-independent.

Figure 2:
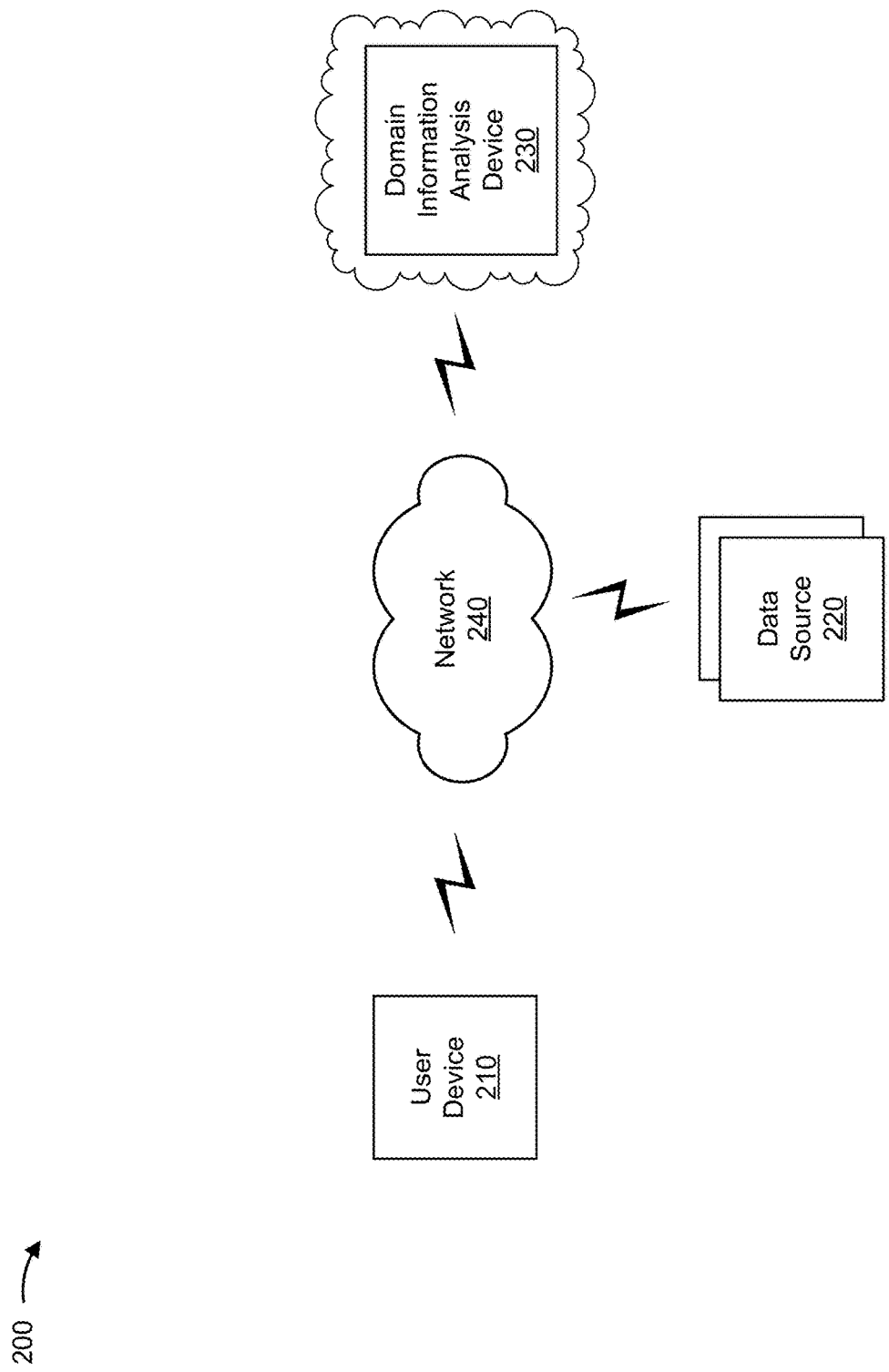
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more data sources 220, a domain information analysis device 230, and/or a network 240. Devices of environment 200 may interconnect via wired connections, wireless connections, or a combination of wired and wireless connections.

User device 210 includes one or more devices capable of receiving, storing, generating, processing, and/or providing information associated with an organization within a particular domain. For example, user device 210 include a communication and computing device, such as a phone (e.g., a mobile phone, a radiotelephone, etc.), a laptop computer, a tablet computer, a handheld computer, a wearable communication device (e.g., a virtual reality headset, a pair of smart eyeglasses, etc.), or a similar type of device. In some implementations, user device 210 may receive, from domain information analysis device 230, key entities, key values, and key associations associated with a particular domain or a particular sub-domain.

Data source 220 includes one or more devices capable of receiving, storing, generating, processing, and/or providing information associated with an organization within a particular domain. For example, data source 220 may include a computing device (e.g., a desktop computer, a laptop computer, a tablet computer, a handheld computer, a server device, etc.), a mobile phone (e.g., a smart phone, a radiotelephone, etc.), or a similar device. In some implementations, data source 220 may provide historical data to domain information analysis device 230.

In some implementations, data source 220 may store information obtained from one or more sensors. For example, an organization within a particular domain may use one or more sensors to obtain data from an external environment, and may store the data using data source 220. The one or more sensors may include a sensor that detects temperature, weather, moisture, humidity, and/or the like, a sensor that detects blood pressure, body temperature, heartbeat, and/or the like, a sensor that senses acoustic, sound, and/or vibrations, a sensor that detects positions, angles, displacements, distances, speeds, accelerations, and/or the like, and/or any other sensor that may be used by an organization associated with a particular domain.

Domain information analysis device 230 includes one or more devices capable of receiving, storing, generating, processing, and/or providing information associated with an organization within a particular domain. For example, domain information analysis device 230 may include a workstation computer, a laptop computer, a server device (e.g., a host server, a web server, an application server, etc.), a cloud device, a data center device, or a similar device.

Network 240 includes one or more wired and/or wireless networks. For example, network 240 may include a cellular network (e.g., a fifth generation (5G) network, a fourth generation (4G) network, such as a long entity evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
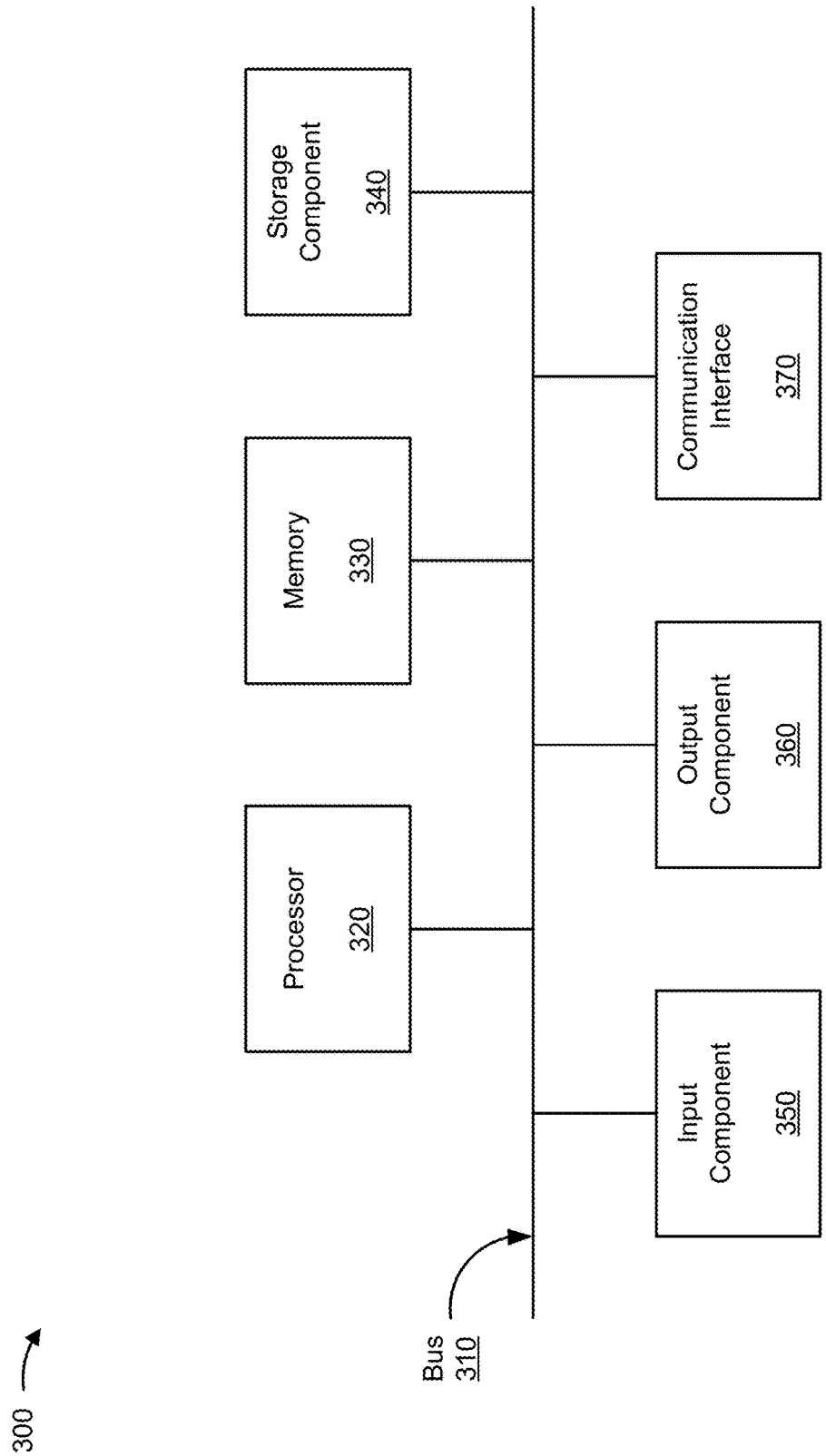
FIG. 3 is a diagram of example components of one or more devices of FIG. 2.

FIG. 3 is a diagram of example components of a device 300. Device 300 may correspond to user device 210, data source 220, and/or domain information analysis device 230. In some implementations, user device 210, data source 220, and/or domain information analysis device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
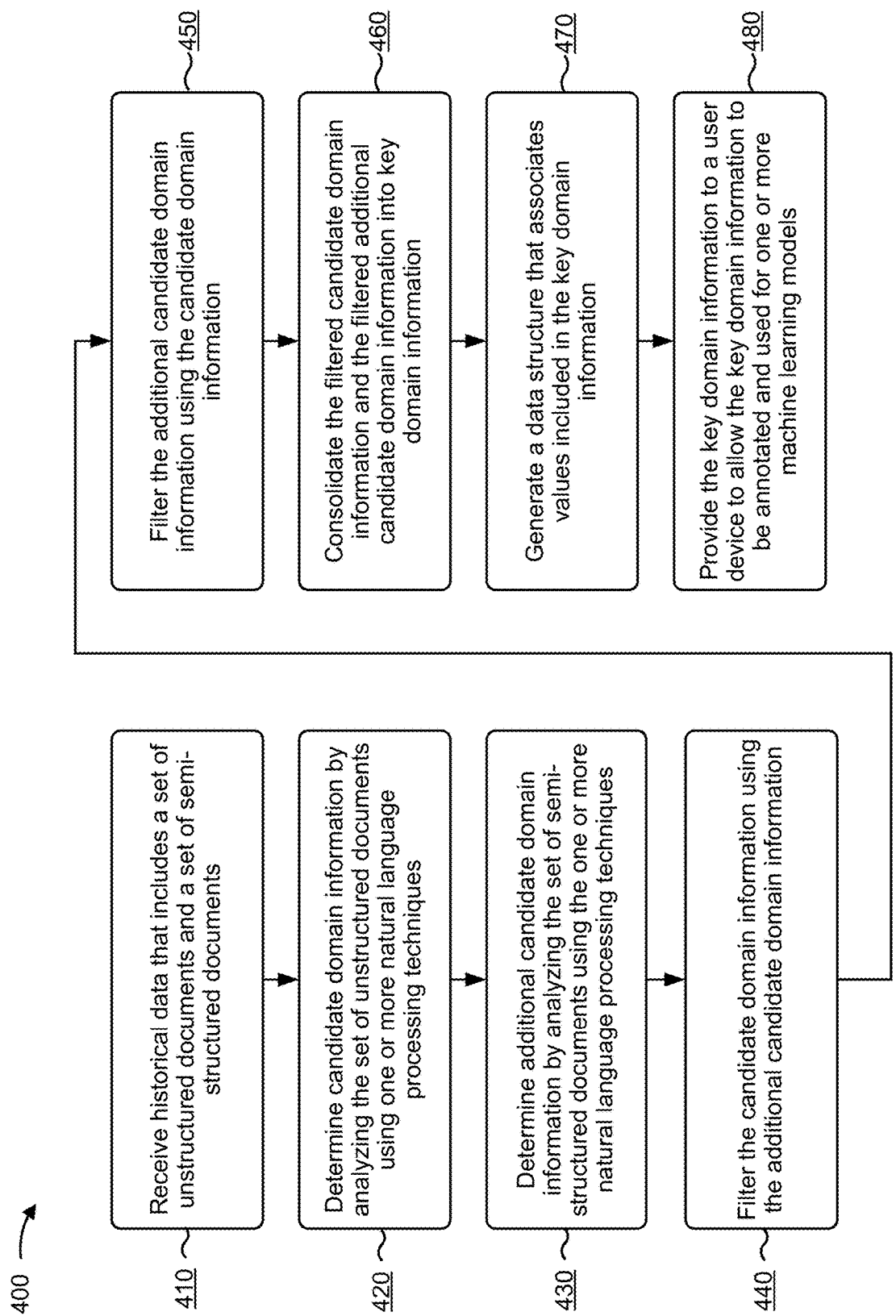
FIG. 4 is a flow chart of an example process for analyzing historical data to identify a set of key entities, a set of key values, and/or a set of key associations that may be used to train one or more machine learning models that that are capable of improving processes within a client organization.

FIG. 4 is a flow chart of an example process 400 for analyzing historical data to identify a set of key entities, a set of key values, and/or a set of key associations that may be used to train one or more machine learning models that that are capable of improving processes within a client organization. In some implementations, one or more process blocks of FIG. 4 may be performed by domain information analysis device 230. In some implementations, one or more process blocks of FIG. 4 may be performed by another device or a group of devices separate from or including domain information analysis device 230, such as user device 210 and data source 220.

As shown in FIG. 4, process 400 may include receiving historical data that includes a set of unstructured documents and a set of semi-structured documents (block 410). For example, domain information analysis device 230 may receive, from data source 220, historical data of an organization associated with a particular domain (e.g., an information technology (IT) domain, a healthcare domain, a retail domain, a financial domain, etc.).

In some implementations, data source 220 may store historical data of an organization associated with a particular domain. For example, data source 220 may store historical data using one or more data structures, such as a graph, a table, a linked-list, an array, a hash table, a tree, a database, and/or the like. In this case, data source 220 may store large quantities of data (e.g., hundreds of thousands, millions, billions, etc. of data points), such that a human operator or an inferior data source may be objectively unable to store and/or process.

In some implementations, data source 220 may store a set of unstructured documents of the organization. For example, assume the organization operates within a healthcare domain. In this case, data source 220 may store e-mails (e.g., between a doctor and patient), activity logs (e.g., where a doctor or a nurse inputs a free-form description of an event or a patient), information found on publicly accessible message boards, and/or the like. As an example, an e-mail that describes a conversation between a doctor and a patient may include a large amount of unstructured text (i.e., the contents of the e-mail correspondence). Additionally, if the organization operates in multiple countries or a in a multi-language country, then data source 220 may store documents that include text written in a number of different languages.

In some implementations, data source 220 may store a set of semi-structured documents of the organization. For example, assume the organization is associated with the healthcare domain. In this case, data source 220 may store patient forms, scheduling documents, invoices, employee training materials, and/or the like. As an example, a patient form may be a semi-structured document that includes a field indicating a patient name, a field indicating an insurance provider, one or more fields for additional patient information (e.g., age, date of birth, height, weight, etc.), an ailment description field, and/or the like. If the organization operates in multiple countries or in a multi-language country, the set of semi-structured documents may include documents with text in a number of different languages (e.g., English, Spanish, French, etc.).

In some implementations, domain information analysis device 230 may receive the historical data of the organization. For example, the organization may contract with a technology consulting organization (e.g., which utilizes domain information analysis device 230) for one or more technical services. As an example, the technology consulting organization may offer technical services to the organization that involve using one or more machine learning models to optimize processes within the organization. To allow the technology consulting organization to provide the technical services, data source 220 may provide the historical data to domain information analysis device 230.

In some implementations, domain information analysis device 230 may obtain the historical data for the organization. For example, domain information analysis device 230 may query data source 220 (e.g., once, periodically over an interval, etc.) to obtain the historical data for the organization. In some implementations, data source 220 may be configured to automatically provide domain information analysis device 230 with historical data.

In some implementations, domain information analysis device 230 may standardize the historical data. For example, domain information analysis device 230 may receive (or obtain) historical data associated with different data types, data formats, and/or the like, and may standardize the historical data to a uniform data type, data format, language, unit of measure (e.g., a value in pounds and a value in kilograms may be converted to a uniform data type), and/or the like. In some implementations, domain information analysis device 230 may apply different standardization techniques for different data types or data formats. By using an appropriate standardization technique for a particular data type or data format, domain information analysis device 230 conserves processing resources relative to using an inappropriate standardization technique.

In this way, domain information analysis device 230 is able to receive historical data of an organization associated with a particular domain.

As shown in FIG. 4, process 400 may include determining candidate domain information by analyzing the set of unstructured documents using one or more natural language processing techniques (block 420). For example, domain information analysis device 230 may determine candidate domain information by analyzing the set of unstructured documents using one or more natural language processing techniques, such as an entity identification technique (e.g., an N-gram approach), a ranking technique (e.g., an entity frequency-inverse entity frequency (EF-IDF) technique), an association detection technique (e.g., a long short-entity memory (LSTM) technique), a pattern-based technique, and/or the like.

The candidate domain information may refer to information found in the set of unstructured documents that may be useful for annotating and using as part of a machine learning model, and may include a first set of entities, a first set of values, and/or a first set of associations. An entity, as used herein, may refer to a term (e.g., a word, a phrase, etc.) that is associated with one or more domains. A value, as used herein, may refer to a particular combination of characters, such as a word, multiple words (e.g., a phrase, a sentence, etc.), and/or the like. An association, as used herein, may refer to an association between two or more entities, between two or more values, between one or more entities and one or more values, and/or the like.

In some implementations, prior to determining the first set of entities and/or the first set of values, domain information analysis device 230 may generate a set of N-grams for all (or some) possible entities and/or values within each unstructured document. For example, domain information analysis device 230 may analyze the set of unstructured documents using an N-gram technique to generate a set of N-grams. In this case, domain information analysis device 230 may analyze (e.g., parse) each unstructured document to generate the set of N-grams. In this way, domain information analysis device 230 is able to generate an N-gram for all (or some) possible entities within each unstructured document.

In some implementations, domain information analysis device 230 may determine the first set of entities and/or the first set of values by sorting (e.g., ranking) and/or filtering the set of N-grams. For example, domain information analysis device 230 may execute an entity frequency-inverse document frequency (EF-IDF) technique to identify the first set of entities and the first set of values. In this case, the entity frequency (EF) portion of the EF-IDF technique may consider a frequency of an entity in a particular unstructured document. The IDF portion of the EF-IDF technique may diminish an EF value based on a frequency of the entity in the overall set of unstructured documents. In this way, the EF-IDF technique is able to determine entities and/or values that are important to a particular domain while still excluding stop words (e.g., a, the, and, etc.) and other less important entities and/or values.

In some implementations, domain information analysis device 230 may determine the first set of associations by executing an association detection technique. For example, domain information analysis device 230 may use a recurrent neutral network (RNN) technique, such as a long short-entity memory (LSTM) technique to determine the first set of associations. In this case, domain information analysis device 230 may use the LSTM technique to determine an association between two or more entities in an unstructured document, an association between two or more values in an unstructured document, an association between one or more entities and one or more values in an unstructured document, and/or the like. Additionally, the LSTM technique may determine associations based on lexical indicators included within the unstructured documents, based on sentence context information for one or more sentences included within the unstructured documents, and/or the like.

As an example, assume an unstructured document is an e-mail between a doctor and a patient. Further assume the e-mail includes a written description where the patient indicates a patient name, a patient address, a patient height, and a patient weight. In this case, domain information analysis device 230 may execute the LSTM technique to identify that the patient name has an association with the patient address, the patient height, and the patient weight. The association may be determined based on each entity and/or value using the word patient, based on each entity and/or value being used in the same sentence or in the same context (e.g., each entity or value may be used while discussing the same subject of the sentence, which may be the patient).

In this way, domain information analysis device 230 is able to determine candidate domain information.

As shown in FIG. 4, process 400 may include determining additional candidate domain information by analyzing the set of semi-structured documents using the one or more natural language processing techniques (block 430). For example, domain information analysis device 230 may analyze the set of semi-structured documents to identify document-specific metadata, and may use the document-specific metadata to determine additional candidate domain information, such as a second set of entities, a second set of values, and/or a second set of associations.

In some implementations, domain information analysis device 230 may identify document-specific metadata included in the set of semi-structured documents. For example, domain information analysis device 230 may parse text included in the set of semi-structured documents to identify document-specific metadata. The document-specific metadata may include information associated with a document layout, information associated with positioning of entities or values within a document, information associated with format indicators (e.g., a colon, a semi-colon, a dash, a comma, a tab, a white space, etc.), and/or the like.

In some cases, document-specific metadata may be used to separate entities and values within a semi-structured document. For example, domain information analysis device 230 may identify a particular format indicator as document-specific metadata, and may use the particular format indicator to separate entities and values within the semi-structured document.

In some implementations, domain information analysis device 230 may use the document-specific metadata to identify the second set of entities and/or the second set of values. For example, domain information analysis device 230 may use a format indicator to delineate between entities and values within a semi-structured document. As an example, assume the historical data includes a semi-structured patent form. The patient form may re-use a particular format indicator (e.g., a colon) as a delineator between fields (i.e., entities) and values. For example, the patient form may include "Name: John Doe," "Gender: Male," and "Height: 5'9." In this case, domain information analysis device 230 may use the format indicator (i.e., the colon) to identify "Name," "Gender," and "Height" as entities, and to identify "John Doe," "Male," and "5'9" as values.

In some implementations, domain information analysis device 230 may determine the second set of associations. For example, domain information analysis device 230 may use an association detection technique (e.g., the LSTM technique) and document-specific metadata to determine the second set of associations. In this case, the semi-structured documents may not include as much sentence context information as the unstructured documents, but may be able to identify associations based on document-specific metadata. As an example, if a top third of a patient form is always reserved for patient information, the information in the top third of each patient form may include entities and/or values that share an association (e.g., each entity may be associated with patient information for a particular patient).

In this way, domain information analysis device 230 is able to determine additional candidate domain information.

As shown in FIG. 4, process 400 may include filtering the candidate domain information using the additional candidate domain information (block 440). For example, domain information analysis device 230 may filter the first set of entities and/or the first set of values using the second set of entities and/or the second set of values. Additionally, domain information analysis device 230 may filter the first set of associations using the second set of associations.

In some implementations, the candidate domain information may include one or more "noisy" entities, values, and/or associations. A noisy entity, value, and/or association, as described herein, may refer to an entity, a value, and/or an association that includes spelling errors, abbreviations, non-standard words, missing punctuation, missing letters, pause words (e.g., um), stop words, and/or the like.

In some implementations, domain information analysis device 230 may filter the first set of entities using the second set of entities. For example, the second set of entities may include less noisy entities than the first set of entities as a result of domain information analysis device 230 identifying the second set of entities using document-specific metadata (e.g., which often delineates entities and values via metadata, such as format indicators). As such, the second set of entities may be used to filter noisy entities that are included in the first set of entities.

As an example, domain information analysis device 230 may compare an entity, of the first set of entities, and one or more entities, of the second set of entities. In this case, domain information analysis device 230 may determine that the entity, of the first set of entities, does not satisfy a threshold level of similarity with the one or more entities, of the second set of entities. Furthermore, domain information analysis device 230 may remove the entity, from the first set of entities, based on determining that the entity does not satisfy the threshold level of similarity with the one or more entities, of the second set of entities. In this way, domain information analysis device 230 is able to filter out noisy entities from the first set of entities.

In some implementations, domain information analysis device 230 may filter the first set of values using the second set of values. For example, domain information analysis device 230 may filter the first set of values in the same manner described above with respect to filtering the first set of entities.

In some implementations, domain information analysis device 230 may filter the first set of associations using the second set of associations. For example, second set of associations may include associations that were identified from the document-specific metadata, which may be used to filter noisy associations that may be included in the first set of associations.

In this way, domain information analysis device 230 is able to filter the candidate domain information using the additional candidate domain information.

As shown in FIG. 4, process 400 may include filtering the additional candidate domain information using the candidate domain information (block 450). For example, domain information analysis device 230 may filter the second set of entities and/or the second set of values using the first set of entities and/or the first set of values. Additionally, domain information analysis device 230 may filter the second set of associations using the first set of associations.

In some implementations, the additional candidate domain information may include one or more noisy entities, values, and/or associations, as defined above.

In some implementations, domain information analysis device 230 may filter the second set of entities using the first set of entities. For example, domain information analysis device 230 may filter the second set of entities by determining that an entity, of the second set of entities, does not satisfy a threshold level of similarity with one or more entities, of the first set of entities. In this case, domain information analysis device 230 may remove the entity, from the second set of entities, based on determining that the entity does not satisfy the threshold level of similarity with the one or more entities, of the first set of entities.

In some implementations, domain information analysis device 230 may filter the second set of values using the first set of values. For example, domain information analysis device 230 may filter the second set of values in the same manner described above with respect to filtering the second set of entities.

In some implementations, domain information analysis device 230 may filter the second set of associations using the first set of associations. For example, the first set of associations may include less noisy associations than the second set of associations because unstructured documents often include more sentence context information (e.g., relative to semi-structured documents, which may include shorter, more specific responses to particular questions or fields within the semi-structure documents). As such, the first set of associations may be used to filter noisy associations that are included in the second set of associations.

As an example, domain information analysis device 230 may compare an association, of the second set of associations, and one or more associations, of the first set of associations. Additionally, domain information analysis device 230 may determine that the association, of the second set of associations, does not satisfy a threshold level of similarity with the one or more associations, of the first set of associations. Furthermore, domain information analysis device 230 may remove the association, from the second set of associations, based on determining that the association does not satisfy the threshold level of similarity with the one or more associations, of the first set of associations.

In this way, domain information analysis device 230 is able to filter the additional candidate domain information using the candidate domain information.

As shown in FIG. 4, process 400 may include consolidating the filtered candidate domain information and the filtered additional candidate domain information into key domain information (block 460). For example, domain information analysis device 230 may consolidate the filtered candidate domain information and the filtered additional candidate domain information into key domain information, such as a set of key entities, a set of key values, and/or a set of key associations.

In some implementations, domain information analysis device 230 may consolidate the filtered candidate domain information and the filtered additional candidate domain information into the key domain information. For example, domain information analysis device 230 may compare entities included in the filtered candidate domain information and entities included in the filtered additional candidate domain information. In this case, domain information analysis device 230 may remove duplicate entities identified from the comparison. Additionally, domain information analysis device 230 may perform a similar process to filter out duplicate values and/or duplicate associations.

In some implementations, after determining the key domain information, domain information analysis device 230 may execute a testing procedure to test the accuracy of the key domain information. For example, domain information analysis device 230 may receive a test document that includes information associated with the organization (e.g., a single patient form). In this case, domain information analysis device 230 may analyze the test document using one or more techniques mentioned above (e.g., the natural language processing techniques, the filtering techniques, etc.) to determine key domain information associated with the test document. Additionally, domain information analysis device 230 may provide the key domain information associated with the test document to a user device to allow a user to verify whether the key domain information is accurate.

If the key domain information is accurate, the user may provide an acknowledgement message back to domain information analysis device 230. If the key domain information is not accurate, or does not satisfy a threshold level of accuracy, then the user may provide feedback to domain information analysis device 230 to explain the error(s). The feedback may be used to modify one or more natural language processing techniques and/or filtering techniques described above, thereby allowing subsequent documents to be more accurately processed.

In this way, domain information analysis device 230 is able to consolidate the filtered candidate domain information and the filtered additional candidate domain information into key domain information.

As shown in FIG. 4, process 400 may include generating a data structure that associates values included in the key domain information (block 470). For example, domain information analysis device 230 may generate a data structure (e.g., a taxonomy, an ontology, etc.) that associates values included in the key domain information.

In some implementations, domain information analysis device 230 may generate a graph data structure. For example, domain information analysis device 230 may generate a graph data structure that uses key entities and/or key values as nodes and key associations as edges. In other cases, domain information analysis device 230 may generate a data structure using a dictionary, a tree, a linked-list, an array, a hash table, and/or the like.

In some implementations, domain information analysis device 230 may generate a data structure to associate key domain information of different sub-domains within the same domain. For example, assume that historical data of an organization that operates within a healthcare domain can be broken into sub-domains (e.g., sub-domains relating to healthcare, such as patient communications, employee training, etc.). In this case, domain information analysis device 230 may identify key domain information for historical data associated with a first sub-domain (e.g., patient communications) and may identify key domain information for historical data associated with a second sub-domain (e.g. employee training materials).

Additionally, domain information analysis device 230 may generate a data structure that associates both the key domain information associated with the first sub-domain and the key domain information associated with the second sub-domain. In this case, the data structure may be used to identify entities, values, and/or associations that overlap between sub-domains, entities, values, and/or associations that overlap between domains, and/or the like.

In some implementations, domain information analysis device 230 may execute a sub-graph clustering algorithm that identifies one or more segments within the graph data structure. For example, domain information analysis device 230 may execute a sub-graph clustering algorithm to sort one or more portions of the graph data structure based on similarity of the values, and the sub-graph clustering algorithm may output one or more segments within the graph data structure that include similar values. A segment, as used herein, may refer to a group of entities, values, associations, and/or the like, that share one or more common properties. As an example, a patient name, a patient address, a patient weight, a patient age, and/or a patient height may be determined to be part of a segment associated with user profile information.

In some implementations, once entities, values, segments, and/or the like are identified, various entities, such as invoice number, invoice date, invoice amount, purchase order (PO) number, vendor name, account number, tax, payee zip code, and/or the like are obtained and corresponding entity types are also defined. Each segment is labelled with category names, such as invoice header, item description, payment details, vendor details, bank details, regulations, and/or the like.

In some implementations, a first segment graph using all (or some) of the segments is constructed using co-occurrence statistics. For example, if there are a particular number of segments, each segment may act as a node in the graph. In this case, edges may be formed by connecting the rest of the segment nodes, thereby allowing the segment graph to be constructed.

Additionally, dominant segment clusters from a final graph are identified using a sub-graph clustering algorithm. In the next step, a list of entities are identified from the sub-clusters and an entity graph is compiled where entities are the nodes, and the edges are links which are present among the obtained clusters in the segment graph. In this way, the entity graph may be compiled from information included in the segment graph.

Additionally, the labels for the edges (the relationships) are manually added to the taxonomy. For example, if there is an invoice number node and an invoice date connected in the entity graph, then the invoice number and invoice date may be said to be related. The relationship or edge name may state "has" since "invoice number" "has" a relationship with "invoice date." Similarly, "is a," "part of," "parent-child," and/or similar relationships may be included in the taxonomy. The taxonomy may be useful for determining insights that may be used to improve decision making performed using the entities. In some cases, the graphs may be constructed using open-source graph databases.

In this way, domain information analysis device 230 is able to generate a data structure that associates values included in the key domain information.

As shown in FIG. 4, process 400 may include providing the key domain information to a user device to allow the key domain information to be annotated and used to for one or more machine learning models (block 480). For example, domain information analysis device 230 may provide the key domain information to user device 210. In this case, user device 210 may annotate (i.e., score) the key domain information as part of training one or more machine learning models. Additionally, user device 210 may provide the one or more trained machine learning models to a device of the organization that operates in the particular domain to allow the device to use the one or more one or more trained machine learning models to improve business processes.

In some implementations, user device 210 may be used to train a machine learning model. For example, a software developer may interact with user device 210 to annotate the key domain information as part of training the machine learning model. In this case, the trained machine learning model may include an annotated set of key entities, an annotated set of key values, and/or an annotated set of key associations. In some implementations, user device 210 may provide the trained machine learning model to a device of the organization that operates in the particular domain.

In some implementations, the device of the organization that operates in the particular domain may use the trained machine learning model to improve one or more business processes. For example, live data associated with the organization may be provided as input to the trained machine learning model, which may cause the machine learning model to output one or more predictions and/or classifications associated with improving business processes.

In this way, domain information analysis device 230 is able to provide the key domain information to user device 210 to allow a user to annotate the key domain information as part of training one or more machine learning models that may be executed to improve business processes.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, domain information analysis device 230 automates the process of identifying domain information that may be annotated and used for training machine learning models. Furthermore, domain information analysis device 230 conserves processing resources that might otherwise be used to process inaccurate entities, inaccurate values, and/or inaccurate associations that are manually input by a user.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the entity component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the entity "set" is intended to include one or more items (e.g., related items, unrelated items, a combination of related and unrelated items, etc.), and may be used interchangeably with "one or more." Where only one item is intended, the entity "one" or similar language is used. Also, as used herein, the entities "has," "have," "having," or the like are intended to be open-ended entities. Further, the phrase "based on" is intended to mean "based, at least in part, on" unless explicitly stated otherwise.

What is claimed is:

1. A device, comprising:
  one or more processors to:
    receive historical data of an organization associated with a particular domain,
      the historical data including a set of unstructured documents and a set of semi-structured documents;
    determine candidate domain information by analyzing the set of unstructured documents using one or more natural language processing techniques,
      the candidate domain information including at least one of:
        a first set of entities, or
        a first set of associations;
    determine additional candidate domain information by analyzing the set of semi-structured documents using the one or more natural language processing techniques,
      the additional candidate domain information including at least one of:
        a second set of entities, or
        a second set of associations, and
      where the one or more processors, when determining the additional candidate domain information, are to:
        determine the second set of entities by parsing the set of semi-structured documents with document-specific metadata;
    filter the candidate domain information using the additional candidate domain information,
      where the one or more processors, when filtering candidate domain information, are to:
        compare an entity, of the first set of entities, and one or more entities of the second set of entities,
        determine that the entity, of the first set of entities, does not satisfy a threshold level of similarity with the one or more entities of the second set of entities, and
        remove the entity, of the first set of entities, based on determining that the entity does not satisfy the threshold level of similarity with the one or more entities of the second set of entities;
    filter the additional candidate domain information using the candidate domain information;
    consolidate the filtered candidate domain information and the filtered additional candidate domain information into key domain information;
    generate a data structure that associates values included in the key domain information; and
    provide the key domain information to a user device to allow the key domain information to be annotated and used for one or more machine learning models.

2. The device of claim 1, where the set of unstructured documents and/or the set of semi-structured documents include documents with text in different languages.

3. The device of claim 1, where the one or more processors, when determining the candidate domain information, are to:
  determine the first set of entities by analyzing the set of unstructured documents using an entity identification technique,
    the entity identification technique to parse through the set of unstructured documents to create the first set of entities; and
  where the one or more processors, when determining the additional candidate domain information, are to:
    analyze the set of semi-structured documents to identify the document-specific metadata included in the set of semi-structured documents,
      the document-specific metadata including at least one of:
        information associated with a document layout,
        information associated with positioning of entities within a document, or
        information associated with format indicators.

4. The device of claim 1, where the one or more processors, when determining the candidate domain information, are to:
  determine the first set of associations by analyzing the set of unstructured documents using a first association detection technique,
    the first association detection technique to use lexical indicators and sentence context information to determine the first set of associations; and
  where the one or more processors, when determining the additional candidate domain information, are to:
    determine the second set of associations by analyzing the set of semi-structured documents using a second association detection technique,
      the second association detection technique to use the document-specific metadata included in the set of semi-structured documents to determine the second set of associations.

5. The device of claim 1, where the one or more processors, when filtering the additional candidate domain information, are to:
  compare an association, of the second set of associations, and one or more associations of the first set of associations,
  determine that the association, of the second set of associations, does not satisfy a threshold level of similarity with the one or more associations of the first set of associations, and
  remove the association, of the second set of associations, based on determining that the association does not satisfy the threshold level of similarity with the one or more associations of the first set of associations.

6. The device of claim 1, where the one or more processors, when providing the key domain information to the user device, are to:
  provide the key domain information for display on a user interface of the user device,
    the key domain information including a set of key entities and a set of key associations,
    where the user interface displays the set of key entities and the set of key associations in a manner that allows the set of key entities and the set of key associations to be annotated and used for a machine learning model of the one or more machine learning models.

7. The device of claim 1, where the one or more processors are further to:
execute a testing procedure to test an accuracy of the key domain information.

8. A method, comprising:
receiving, by a device, historical data of an organization associated with a particular domain,
the historical data including a set of unstructured documents and a set of semi-structured documents;
analyzing, by the device, the set of unstructured documents using one or more natural language processing techniques to identify a first set of entities;
determining, by the device, a second set of entities by analyzing the set of semi-structured documents using the one or more natural language processing techniques,
where determining the second set of entities comprises:
determining the second set of entities by parsing the set of semi-structured documents with document-specific metadata;
filtering, by the device, the first set of entities using the second set of entities,
where filtering the first set of entities includes:
comparing one or more entities, of the first set of entities, and one or more entities of the second set of entities,
determining that the one or more entities, of the first set of entities, does not satisfy a threshold level of similarity with the one or more entities of the second set of entities, and
removing, from the first set of entities, the one or more entities that do not satisfy a threshold level of similarity with the one or more entities included in the second set of entities;
consolidating, by the device, the filtered first set of entities and the second set of entities to identify a set of key entities;
generating, by the device, a data structure that is used to store the set of key entities; and
providing, by the device, the set of key entities to a user device to allow the set of key entities to be annotated and used for one or more machine learning models.

9. The method of claim 8, further comprising:
determining, after receiving the historical data, a first set of associations associated with the set of unstructured documents;
determining, after receiving the historical data, a second set of associations associated with the set of semi-structured documents;
filtering the second set of associations using the first set of associations,
where filtering the second set of associations includes removing, from the second set of associations, one or more associations that do not satisfy a threshold level of similarity with associations included in the first set of associations;
consolidating the first set of associations and the filtered second set of associations to identify a set of key associations; and
where generating the data structure comprises:
generating the data structure,
the data structure to associate the set of key entities with the set of key associations.

10. The method of claim 8, further comprising:
filtering, after analyzing the set of semi-structured documents, the second set of entities using the first set of entities,
where the filtering of the second set of entities includes removing, from the second set of entities, one or more entities that do not satisfy a threshold level of similarity with entities included in the first set of entities.

11. The method of claim 8, where the set of unstructured documents and/or the set of semi-structured documents include text written in different languages.

12. The method of claim 8, where determining the first set of entities comprises:
analyzing the set of unstructured documents using an entity identification technique,
the entity identification technique to parse through the set of unstructured documents to determine the first set of entities, and
sorting the first set of entities using an entity frequency-inverse entity frequency (EF-IDF) technique; and
where determining the second set of entities comprises:
analyzing the set of semi-structured documents to identify the document-specific metadata included in the set of semi-structured documents, and
determining the second set of entities by parsing the set of semi-structured documents using the document-specific metadata.

13. The method of claim 8, where providing the set of key entities to the user device comprises:
providing the set of key entities for display on a user interface of the user device,
where the user interface displays the set of key entities in a manner that allows the set of key entities to be annotated and used for a machine learning model of the one or more machine learning models.

14. The method of claim 8, further comprising:
executing a testing procedure to test an accuracy of the set of key entities.

15. A non-transitory computer-readable medium storing instructions, the instructions comprising:
one or more instructions that, when executed by one or more processors, cause the one or more processors to:
receive historical data of an organization associated with a particular domain,
the historical data including a set of unstructured documents and a set of semi-structured documents;
determine candidate domain information by analyzing the set of unstructured documents using one or more natural language processing techniques,
the candidate domain information including at least one of:
a first set of entities, or
a first set of values;
determine additional candidate domain information by analyzing the set of semi-structured documents using the one or more natural language processing techniques,
the additional candidate domain information including at least one of:
a second set of entities, or
a second set of values, and where the one or more instructions, that cause the one or more processors to determine the additional candidate domain information, cause the one or more processors to:
  determine the additional candidate domain information by parsing the set of semi-structured documents with document-specific metadata;
filter the candidate domain information using the additional candidate domain information,
  where the one or more processors, when filtering candidate domain information, are to:
    compare an entity, of the first set of entities, and one or more entities of the second set of entities,
    determine that the entity, of the first set of entities, does not satisfy a threshold level of similarity with the one or more entities of the second set of entities, and
    remove the entity, of the first set of entities, based on determining that the entity does not satisfy the threshold level of similarity with the one or more entities of the second set of entities;
filter the additional candidate domain information using the candidate domain information;
consolidate the filtered candidate domain information and the filtered additional candidate domain information into key domain information;
generate a data structure that associates values included in the key domain information; and
provide the key domain information to a user device to allow the key domain information to be annotated and used for one or more machine learning models.

16. The non-transitory computer-readable medium of claim 15, where the one or more instructions, when executed by the one or more processors, further cause the one or more processors to:
  determine, after receiving the historical data, a first set of associations associated with the set of unstructured documents,
    where the first set of associations is part of the candidate domain information;
  determine, after receiving the historical data, a second set of associations associated with the set of semi-structured documents,
    where the second set of associations is part of the additional candidate domain information;
  filter the second set of associations using the first set of associations; and
  consolidate the first set of associations and the filtered second set of associations to identify a set of key associations,
    where the set of key associations is part of the key domain information.

17. The non-transitory computer-readable medium of claim 15, where the one or more instructions, that cause the one or more processors to receive the historical data, cause the one or more processors to:
  receive a first unstructured document, of the set of unstructured documents, with text written in a first language,
  receive a second unstructured document, of the set of unstructured documents with text written in a second language,
  receive a first semi-structured document, of the set of semi-structured documents, with text written in a first language, and
  receive a second semi-structured document, of the set of semi-structured documents, with text written in a second language.

18. The non-transitory computer-readable medium of claim 15, where the one or more instructions, that cause the one or more processors to determine the candidate domain information, cause the one or more processors to:
  analyze the set of unstructured documents using an entity identification technique,
    the entity identification technique to parse through the set of unstructured documents to determine the first set of entities,
  sort the first set of entities using a ranking technique; and
  where the one or more instructions, that cause the one or more processors to determine the additional candidate domain information, cause the one or more processors to:
    analyze the set of semi-structured documents to identify document-specific metadata included in the set of semi-structured documents, and
    determine the second set of entities by parsing the set of semi-structured documents using the document-specific metadata.

19. The non-transitory computer-readable medium of claim 15, where the one or more instructions, that cause the one or more processors to filter the candidate domain information using the additional candidate domain information, cause the one or more processors to:
  filter the first set of values by removing, from the first set of values, one or more values that do not satisfy a threshold level of similarity with values included in the second set of values.

20. The non-transitory computer-readable medium of claim 15, where the one or more instructions, that cause the one or more processors to provide the key domain information to the user device, cause the one or more processors to:
  provide the key domain information for display on a user interface of the user device,
    the key domain information including a set of key entities and a set of key values,
  receive, from the user device, a machine learning model, of the one or more machine learning models, that includes an annotated set of key entities and an annotated set of key values,
  receive additional data associated with the organization, and
  provide the additional data as input to the machine learning model to cause the machine learning model to output one or more predictions associated with improving one or more processes within the organization.

* * * * *